US012759947B2

(12) United States Patent
Passman et al.

(10) Patent No.: US 12,759,947 B2
(45) Date of Patent: Oct. 13, 2026

(54) ELECTROMECHANICAL DEVICES AND METHODS FOR FORMING COATING LAYERS ON COMPONENTS THEREOF

(71) Applicant: HONEYWELL INTERNATIONAL INC., Charlotte, NC (US)

(72) Inventors: Eric P. Passman, Morris Plains, NJ (US); Mahdi Mohajeri, Morris Plains, NJ (US)

(73) Assignee: HONEYWELL AEROSPACE US LLC, Phoenix, AZ (US)

( * ) Notice: Subject to any disclaimer, the term of this patent is extended or adjusted under 35 U.S.C. 154(b) by 609 days.

(21) Appl. No.: 18/338,542

(22) Filed: Jun. 21, 2023

(65) Prior Publication Data

US 2024/0425420 A1 Dec. 26, 2024

(51) Int. Cl.

| | |
|---|---|
| ***C04B 35/622*** | (2006.01) |
| ***C04B 35/01*** | (2006.01) |
| ***C04B 41/00*** | (2006.01) |
| ***H01F 27/32*** | (2006.01) |
| ***H01F 41/12*** | (2006.01) |

(52) U.S. Cl.

CPC ........ *C04B 35/62222* (2013.01); *C04B 35/01* (2013.01); *C04B 41/0018* (2013.01); *C04B 41/0072* (2013.01); *H01F 27/324* (2013.01); *H01F 41/125* (2013.01); *C04B 2235/3203* (2013.01); *C04B 2235/3206* (2013.01); *C04B 2235/3215* (2013.01); *C04B 2235/3217* (2013.01); *C04B 2235/3232* (2013.01); *C04B 2235/3244* (2013.01); *C04B 2235/3284* (2013.01); *C04B 2235/3298* (2013.01); *C04B 2235/3409* (2013.01); *C04B 2235/3418* (2013.01); *C04B 2235/96* (2013.01)

(58) Field of Classification Search

CPC .......... C04B 35/62222; C04B 41/0018; C04B 41/0072; C23C 24/08; C23C 24/082; C03C 3/064; C03C 3/066

See application file for complete search history.

(56) References Cited

U.S. PATENT DOCUMENTS

| | | | | |
|---|---|---|---|---|
| 2,879,185 A | 3/1959 | King et al. | | |
| 4,861,657 A * | 8/1989 | Nishino | .................. | C23D 5/00 428/432 |
| 5,013,948 A | 5/1991 | Tumpey et al. | | |

(Continued)

FOREIGN PATENT DOCUMENTS

| | | |
|---|---|---|
| CN | 113800771 A | 12/2021 |
| EP | 1047554 B1 | 8/2009 |

(Continued)

*Primary Examiner* — Noah S Wiese

(74) *Attorney, Agent, or Firm* — Ingrassia, Fisher & Lorenz LLP

(57) ABSTRACT

Electromechanical devices and methods of forming coating layers thereon are provided. The electromechanical devices include components each having one or more surfaces formed of one or more metallic materials and susceptible to operating environments having temperatures in excess of 150° C. for a long term, and electrically insulative coating layers formed on the one or more surfaces of the components. The coating layer is configured to survive in operating environments having temperatures in excess of 180° C. for a long term.

20 Claims, 5 Drawing Sheets

(56) References Cited

U.S. PATENT DOCUMENTS

| | | | | |
|---|---|---|---|---|
| 5,153,070 | A * | 10/1992 | Andrus | C04B 41/009 428/428 |
| 6,623,845 | B1 | 9/2003 | Katsumura et al. | |
| 8,183,974 | B2 | 5/2012 | Wienand et al. | |
| 9,823,136 | B2 | 11/2017 | O'Sullivan et al. | |
| 11,437,188 | B2 | 9/2022 | Piascik et al. | |
| 2003/0129329 | A1 * | 7/2003 | Grossman | C03C 10/0018 501/6 |
| 2003/0228471 | A1 * | 12/2003 | Hayakawa | C03C 8/24 428/426 |
| 2006/0276322 | A1 * | 12/2006 | Hasegawa | C03C 8/04 501/79 |
| 2008/0260952 | A1 * | 10/2008 | Xiao | C04B 35/6263 427/373 |
| 2010/0086825 | A1 * | 4/2010 | Lamberson | C04B 37/025 501/15 |
| 2016/0340232 | A1 | 11/2016 | Mitra et al. | |
| 2020/0098516 | A1 * | 3/2020 | Piascik | H01F 5/06 |

FOREIGN PATENT DOCUMENTS

| | | | |
|---|---|---|---|
| EP | 3051664 | A1 | 8/2016 |
| JP | 2007246382 | A | 9/2007 |
| JP | 2007314376 | A | 12/2007 |
| SU | 1497166 | A1 | 7/1989 |

* cited by examiner

ELECTROMECHANICAL DEVICES AND METHODS FOR FORMING COATING LAYERS ON COMPONENTS THEREOF

TECHNICAL FIELD

The present invention generally relates to electromechanical devices, and more particularly relates to an electromechanical device having components with electrically insulative coating layers thereon that are capable of surviving in environmental conditions with temperatures exceeding 180° C. over a long term.

BACKGROUND

Electric motors can generate relatively large amounts of heat during powered operation. More specifically, during motor operation, current flow through electromagnetic coils causes heat to be generated due, in part, to the resistance of the coils (e.g., copper loss). This heat causes the coil and device temperatures to rise. As the coil temperature increases, the generated heat is typically transferred from the coils toward area(s) with lower temperatures. The temperature that the coil and motor assembly can handle depends mainly on the temperature limits of the electrical insulation used. The higher the temperature the coils and motor assembly can handle, the higher the power density of the motor.

Typically, electromagnetic coils are coated with an organic-based (e.g., polyamide) wire electrical insulation, and other components of the motor assembly are insulated from the electromagnetic coils with various insulators such as slot liners, insulating paper materials, potting materials, adhesive insulating (e.g., fiberglass, polyimide, etc.) tapes, ceramic inserts, and the like. Due to the material properties of these insulators, the operational temperature of the electromagnetic coils of motor assemblies such as these may be limited to less than 240° C. over a short term (e.g., less than 10 hours), and less than 150° C. over a long term. This consequently imposes limits on the applied current and/or electrical potential to the electromagnetic coils, as well as the ambient conditions surrounding the motor. This, in turn, limits the achievable power density, cooling system requirements, and potential operating environments, of the motor (or other electromagnetic devices). Additionally, the heat that is generated in, and transferred away from, the electromagnetic coils, can increase the temperatures of various other components to undesirable levels.

Improving the thermal and environmental capability of electromagnetic devices, such as electric motors, has the potential to dramatically reduce overall size/weight and improve overall efficiency while further improving the power density. The efficiency improvements can be realized by reducing the additional power draw and/or system complexity and/or weight typically required for cooling system components to keep an organically insulated electromagnetic coil/device cool. The ability to operate the electromagnetic device with increased power input and/or at higher temperature would also increase power density.

Hence, there is a need for a method of improving the thermal and environmental capabilities of electromagnetic devices. Furthermore, other desirable features and characteristics of the present invention will become apparent from the subsequent detailed description and the appended claims, taken in conjunction with the accompanying drawings and the foregoing technical field and background.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In various embodiments, a method is provided that includes forming an intermediate coating product from a ceramic powder for application of the coating powder, applying the intermediate product to a surface of a component of an electromechanical device, and thermally processing the intermediate product at a temperature of 800° C. or less to melt the intermediate product and thereby form an electrically insulative coating layer on the surface of the component that is configured to survive in operating environments having temperatures in excess of 180° C. for a long term.

In various embodiments, an electromechanical device is provided that includes components each having one or more surfaces formed of one or more metallic materials and susceptible to operating environments having temperatures in excess of 150° C. for a long term, and electrically insulative coating layers formed on the one or more surfaces of the components. The coating layer is configured to survive in operating environments having temperatures in excess of 180° C. for a long term.

Furthermore, other desirable features and characteristics of the electromechanical device and method will become apparent from the subsequent detailed description and the appended claims, taken in conjunction with the accompanying drawings and the preceding background.

BRIEF DESCRIPTION OF DRAWINGS

The present disclosure will hereinafter be described in conjunction with the following drawing figures, wherein like numerals denote like elements, and wherein.

DETAILED DESCRIPTION

Figure 1:
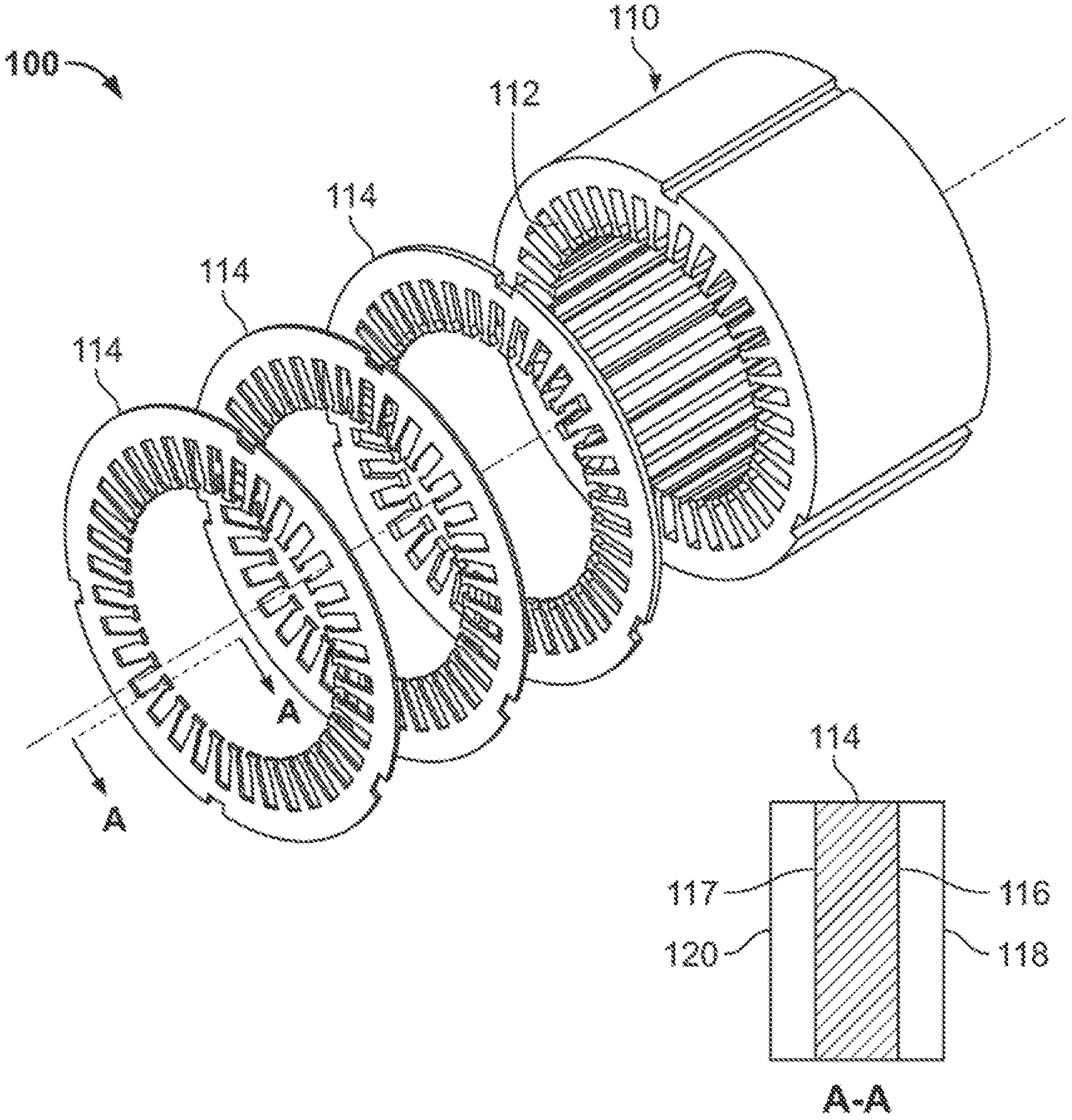
FIG. 1 schematically represents a partially exploded view of a laminated stator having coating layers on surfaces thereof in accordance with an embodiment.

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Components of electromechanical devices having at least one electrically insulative layer or coating layer on surfaces of the components and methods for forming the electrically insulative coating layer on the surfaces of the components are disclosed herein. The components may be parts of various systems and configured for use in various environments. In some embodiments, the components are parts of electromechanical devices such as, but not limited to, linear variable differential transformers (LVDTs), electric motors, generators, transformers, inductors, relays, solenoids, actuators, and sensors. As nonlimiting examples, the components may be portions of a stator (e.g., stator interfaces, stator teeth, stator back-iron, etc.), portions of a rotor, stator and rotor stack inter-laminate insulation, cores, frames, motor end bells, magnetic return walls, various surfaces of enclosures or housings, feedthroughs, and conductor joints. In some embodiments, the components may be parts of electromechanical devices configured for use in automotive, aerospace, medical, industrial, oil and/or gas down-hole drilling, fuel cell, and/or household applications. In various embodiments, the components may be parts of systems that are typically electrically insulated with a separate insulator such as, but not limited to, slot liners, insulating paper materials, adhesive insulating (e.g., fiberglass, polyimide, polyester, etc.) tapes, ceramic inserts, fiber mats (e.g., Nomex® by DuPont de Nemours, Inc.), etc.

The components of the electromechanical devices and the coated surfaces thereof may be formed of or include various materials, including certain metallic, ceramic, and composite materials. In various embodiments, the coated surfaces of the component are formed of or include a conductive material, such as a metallic material. In various embodiments, the coated surfaces of the component may be formed of or include a magnetic material, such as but not limited to iron or ferrite. In various embodiments, the coated surfaces of the component may be formed of or include ASTM A801 Alloy Type 1 (e.g., Hiperco® 50 and Vacudur® 49), electrical steel, samarium cobalt, neodymium, or Mu-metal. In various embodiments, the coated surfaces of the components may be formed of or include a non-magnetic material, such as stainless steel, copper, aluminum, or alloys thereof. In various embodiments, the coated surfaces of the components may be formed of or include Inconel® alloys.

The coating layer may include various electrically insulative materials. In various embodiments, the coating layer may be formed of insulative materials that are capable of surviving in operating environments having temperatures in excess of 180° C. over a long term. As used herein, the phrase "long term" may refer to a minimum operating life, a desired operating life, or an extended operating life of the component and/or a system in which the component is installed. For example, in some embodiments, the phrase long term refers to a period of time in excess of about 40,000 hours, such as about 70,000 hours, such as about 100,000 hours or more. As used herein, the phrase "short term" refers to about 10 hours or less. In various embodiments, the coating layer may provide various properties to the underlying surface of the component in addition to electrical insulation.

In various embodiments, the coating layer may be formed of one or more inorganic materials. In various embodiments, the coating layer includes a mixture of ceramic materials. In various embodiments, the coating layer includes a mixture of $B_2O_3$, $Al_2O_3$, BaO, $SiO_2$, ZnO, $Bi_2O_3$, MgO, $ZrO_2$, and $TiO_2$. In various embodiments, the coating layer includes a mixture of $B_2O_3$, $Al_2O_3$, $SiO_2$, and BaO. In various embodiments, the coating layer includes a mixture of $B_2O_3$, $SiO_2$, ZnO, BaO, and $Bi_2O_3$. In various embodiments, the coating layer includes a mixture of $B_2O_3$, $Al_2O_3$, BaO, $SiO_2$, MgO, $ZrO_2$, and $TiO_2$. The coating layer may have various microstructures and textures. In various embodiments, the coating layer may be amorphous. In various embodiments, the coating layer may be crystalline or semi-crystalline.

In various embodiments, the coating layer includes between 40 and 54 weight percent $B_2O_3$, between 3 and 5 weight percent $Al_2O_3$, between 12 and 17 weight percent $SiO_2$, and between 28 and 38 weight percent BaO. In various embodiments, the coating layer includes between 40 and 54 weight percent $B_2O_3$, between 3 and 5 weight percent $Al_2O_3$, between 12 and 17 weight percent SiO2, between 28 and 38 weight percent BaO, greater than 5 weight percent $Li_2O$, and a remainder including one or more additional constituents or components each having a weight percent of less than one. In various embodiments, the coating layer includes a mixture consisting essentially of $B_2O_3$, $Al_2O_3$, $SiO_2$, and BaO, wherein any other constituents or components thereof are incidental impurities each having a weight percent of less than one, such as less than 0.5 weight percent.

In various embodiments, the coating layer includes between 47 and 64 weight percent $B_2O_3$, between 5 and 7 weight percent $SiO_2$, between 9 and 14 weight percent ZnO, between 6 and 9 weight percent BaO, and between 16 and 22 weight percent $Bi_2O_3$. In various embodiments, the coating layer includes between 47 and 64 weight percent $B_2O_3$, between 5 and 7 weight percent $SiO_2$, between 9 and 14 weight percent ZnO, between 6 and 9 weight percent BaO, between 16 and 22 weight percent $Bi_2O_3$, and a remainder including one or more additional constituents or components each having a weight percent of less than one. In various embodiments, the coating layer includes a mixture consisting essentially of $B_2O_3$, $SiO_2$, ZnO, BaO, and $Bi_2O_3$, wherein any other constituents or components are incidental impurities each having a weight percent of less than one, such as less than 0.5 weight percent.

In various embodiments, the coating layer includes between 27 and 33 weight percent $B_2O_3$, between 24 and 30 weight percent BaO, between 12 and 16 weight percent MgO, between 11 and 13 weight percent $SiO_2$, between 5 and 7 weight percent $Al_2O_3$, between 3 and 4 weight percent $ZrO_2$, and between 2.5 to 3.5 weight percent $TiO_2$. In various embodiments, the coating layer includes between 27 and 33 weight percent $B_2O_3$, between 24 and 30 weight percent BaO, between 12 and 16 weight percent MgO, between 11 and 13 weight percent $SiO_2$, between 5 and 7 weight percent $Al_2O_3$, between 3 and 4 weight percent $ZrO_2$, and between 2.5 to 3.5 weight percent $TiO_2$, and a remainder including one or more additional constituents or components each having a weight percent of less than one. In various embodiments, the coating layer includes a mixture consisting essentially of $B_2O_3$, BaO, MgO, $SiO_2$, $Al_2O_3$, $ZrO_2$, and $TiO_2$, wherein any other constituents or components are incidental impurities each having a weight percent of less than one, such as less than 0.5 weight percent.

In various embodiments, the coating layer includes a eutectic system formed from the mixture.

FIGS. 1-4 illustrate various nonlimiting examples of components having coating layers thereon in accordance with various embodiments. It should be noted that these examples are merely for illustrative purposes and the components and the locations of the coating layers may be different than those shown.

FIG. 1 represents an exemplary stator 100 that includes a plurality of relatively thin laminates 114 bonded together to form a cylindrical body 110 of the stator 100 (three of the laminates 114 are isolated for clarity). Each of the laminates 114 include a ring-shaped member having a plurality of protruding members extending radially inward from the ring-shaped member. In combination, the protruding members of the laminates 114 define stator teeth 112 of the stator 100. Planar surfaces 116 and 117 of the laminates 114 include coating layers 118 and 120 thereon. The coating layers 118 and 120 are configured to provide electrical insulation to surfaces of the stator 100 after bonding of the laminates 114. The surfaces 116 and 117 may be formed of various conductive materials such as, for example, steel, and the coating layers 118 and 120 may be formed of the electrically insulative coating materials described above. In an alternative example, exterior surfaces of the stator teeth and surfaces therebetween may be coated with a coating layer be formed of the electrically insulative coating materials described above after formation of the cylindrical body 110 of the stator.

Figure 2:
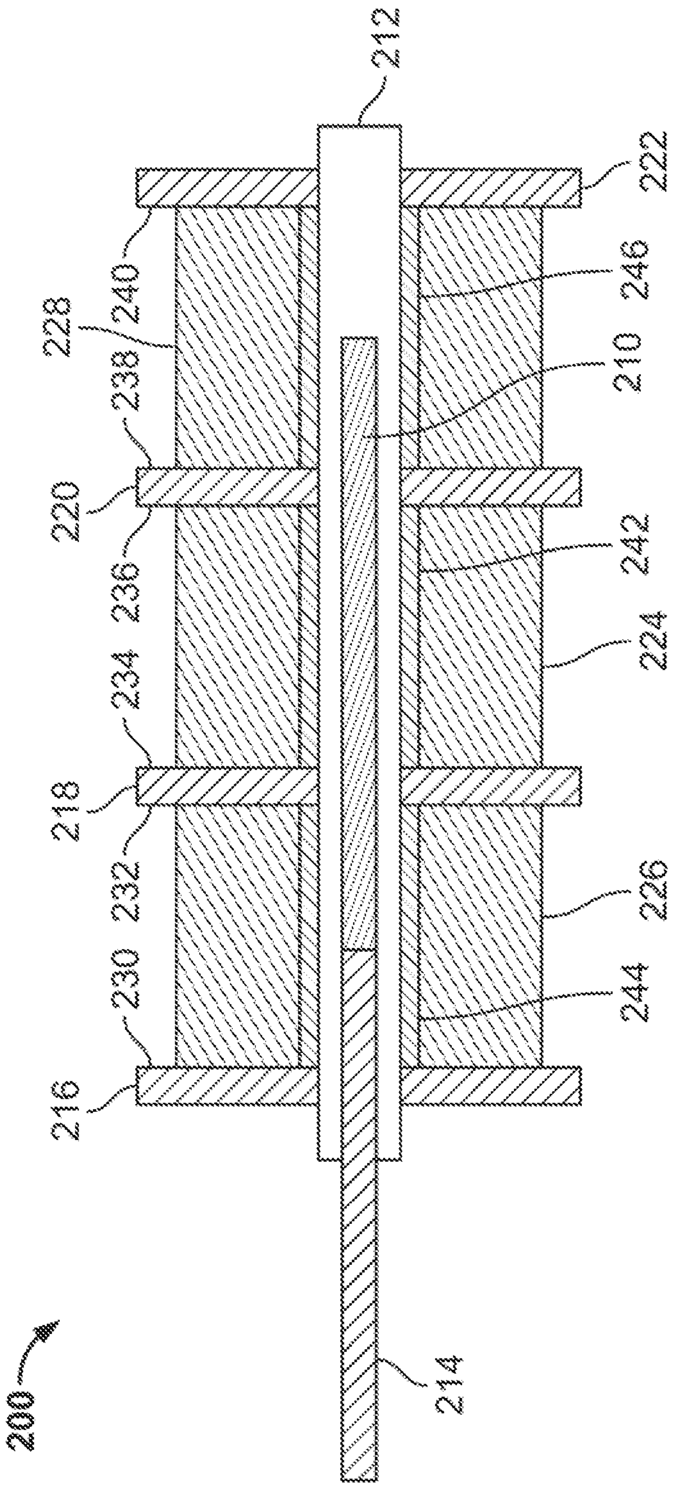
FIG. 2 schematically represents a cross-sectional view of a first linear variable differential transformer (LVDT) having coating layers on surfaces thereof in accordance with an embodiment.

FIG. 2 represents an exemplary first LVDT 200 having a core 210 within a tubular member 212 with radial members 216, 218, 220, and 222 extending therefrom. The core 210 may be coupled to an arm 214. A primary coil 224 of a first conductive wire, a first secondary coil 226 of a second conductive wire, and a second secondary coil 228 of a third conductive wire are wound about the tubular member 212 between separate sections defined by the radial members 216, 218, 220, and 222. Surfaces 230, 232, 234, 236, 238, and 240 of the radial members 216, 218, 220, and 222 that are in contact with the primary coil 224, the first secondary coil 226, or the second secondary coil 228 include coating layers thereon formed of the electrically insulative coating materials described above. In addition, insulation layers 242, 244, and 246 are located between the tubular member 212 and the primary coil 224, the first secondary coil 226, and the second secondary coil 228, respectively. The insulation layers 242, 244, and 246 may be formed of the electrically insulative coating materials described above.

Figure 3:
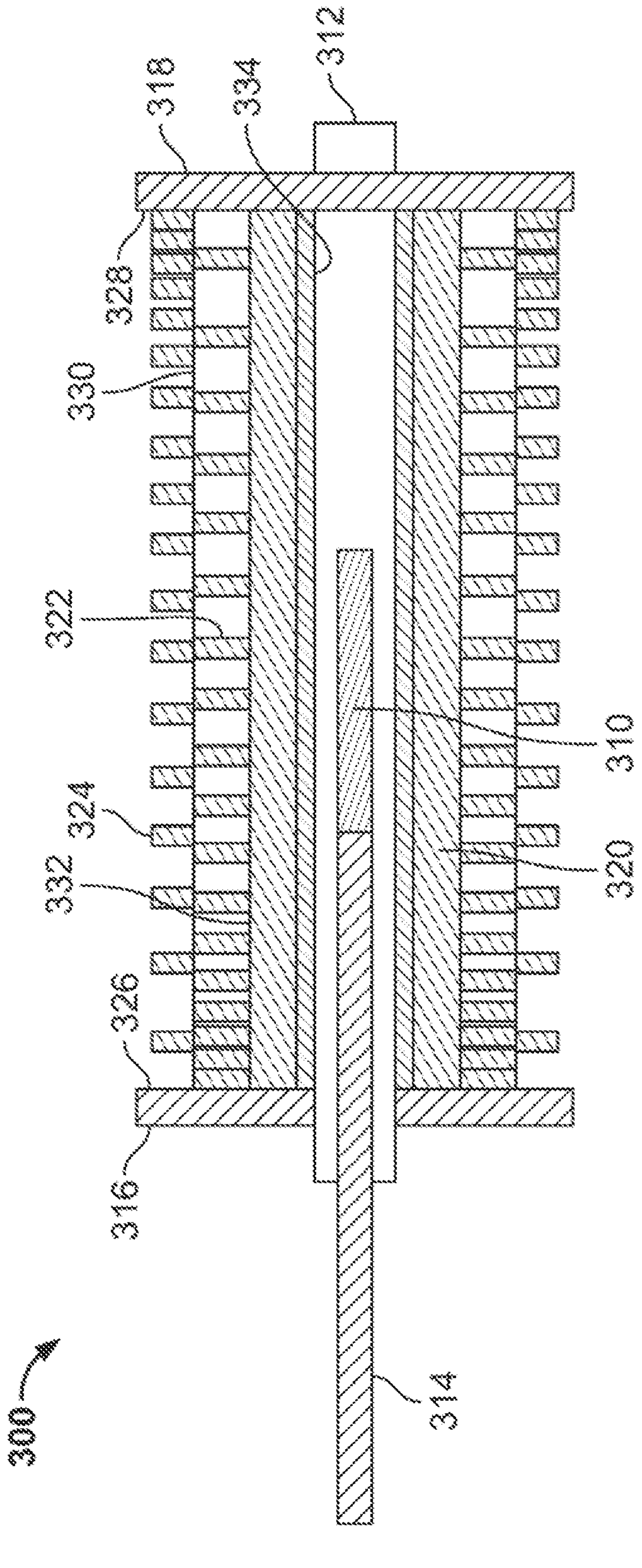
FIG. 3 schematically represents a cross-sectional view of a second LVDT having coating layers on surfaces thereof in accordance with an embodiment.

FIG. 3 represents an exemplary second LVDT 300 having a core 310 within a tubular member 312 with radial members 316 and 318 extending therefrom. The core 310 may be coupled to an arm 314. A primary coil 320 of a first conductive wire is wound about the tubular member 212, a first secondary coil 322 of a second conductive wire is wound about the primary coil 320, and a second secondary coil 324 of a third conductive wire is wound about the first secondary coil 322 between the radial members 316 and 318. Surfaces 326 and 328 of the radial members 316 and 318 that are in contact with the primary coil 320, the first secondary coil 322, and the second secondary coil 324 include coating layers thereon formed of the electrically insulative coating materials described above. In addition, insulation layers 330, 332, 334 are located between the second secondary coil 228 and the first secondary coil 226, between the first secondary coil 226 and the primary coil 224, and between the primary coil 224 and the tubular member 212, respectively. The insulation layers 330, 332, and 334 may be formed of the electrically insulative coating materials described above.

Figure 4:
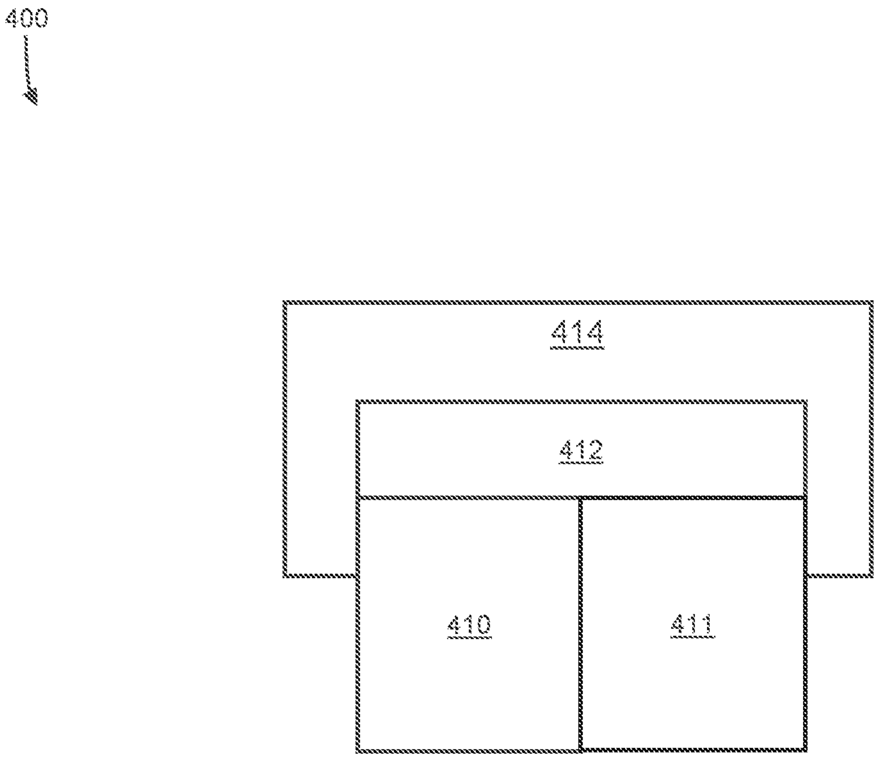
FIG. 4 schematically represents a cross-sectional view of a conductor joint having coating layers on surfaces thereof in accordance with an embodiment.

FIG. 4 represents an electrical joint 400 that includes a pair of conductors (e.g., electrical wires) having electrically conductive surfaces 410 and 411 configured for use in, for example, an electric motor to electrically couple two or more components thereof. The pair of conductors surfaces 410 and 411 of the pair of conductors are physically and electrically coupled via an electrically conductive joint (e.g., solder) on the surfaces 410 and 411. A coating layer 414 on the surfaces 410 and 411 of the pair of conductors and the electrically conductive joint electrically insulates the electrical joint 400. The surfaces 410 and 411 of the conductors may be formed of various conductive materials such as, for example, copper, and the coating layer 414 may be formed of the electrically insulative coating materials described above.

Figure 5:
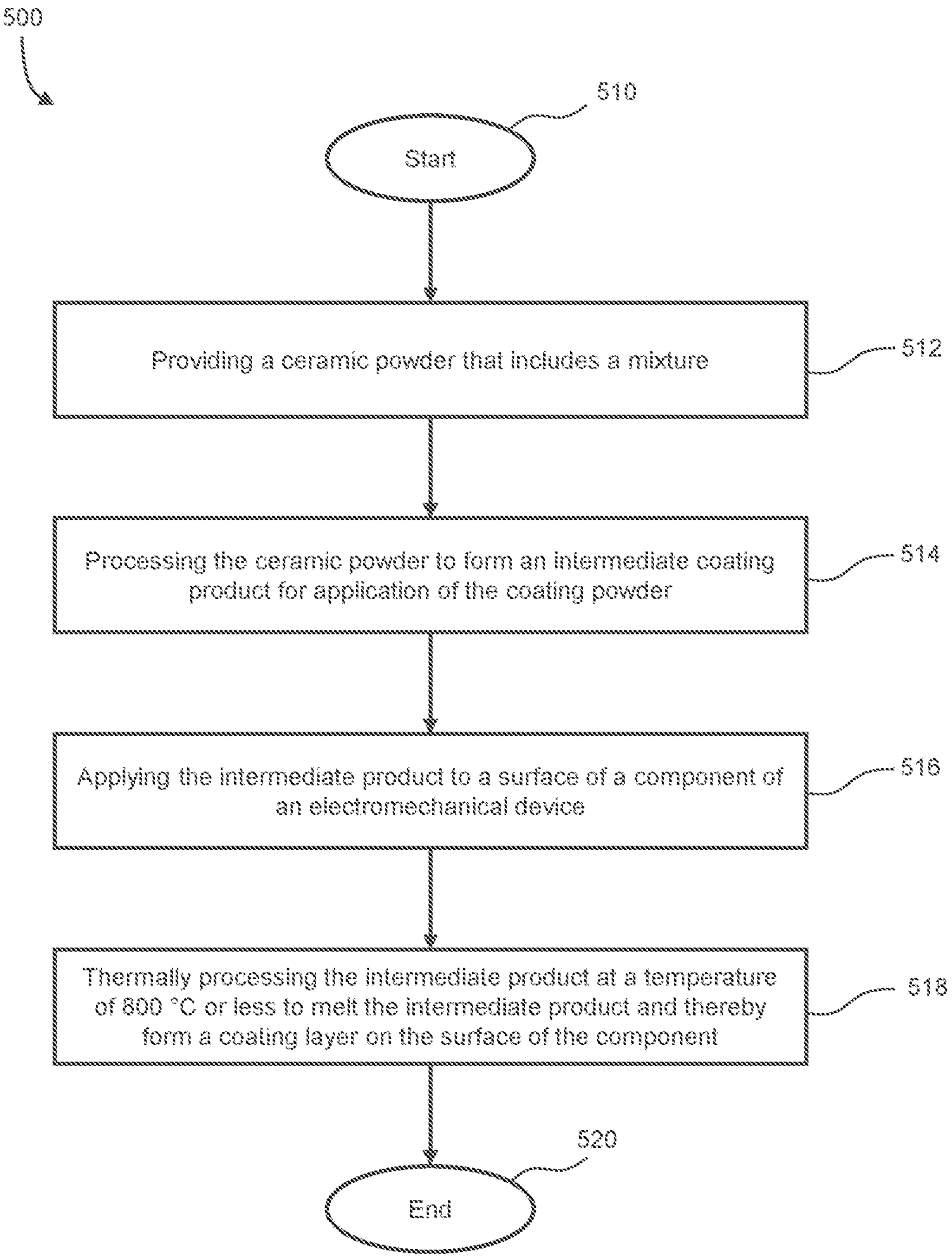
FIG. 5 is a flowchart illustrating an exemplary method for coating components of electromechanical devices in accordance with an embodiment.

Referring to FIG. 5, a flowchart illustrates an exemplary method 500 for forming a coating layer on the surface of a component of an electromechanical device. The method 500 may start at 510. At 512, the method 500 may include providing a ceramic powder that includes a mixture of ceramic materials. Nonlimiting examples of suitable mixtures include $B_2O_3$, $Al_2O_3$, $SiO_2$, and BaO; $B_2O_3$, $SiO_2$, ZnO, BaO, and $Bi_2O_3$; or $B_2O_3$, $Al_2O_3$, BaO, $SiO_2$, MgO, $ZrO_2$, and $TiO_2$. The size, shape, and surface characteristics of particles of the ceramic powder particles may vary. The ceramic powder may be formed using various processes such as, but not limited to, solid-state reaction, sol-gel, spray drying, ball milling, grinding, and hydrothermal synthesis processes.

At 514, the method 500 may include processing the ceramic powder to form an intermediate coating product for application of the coating powder, and at 516, the method 500 may include applying the intermediate product to a surface of a component of an electromechanical device. The method 500 is not limited to any particular type of intermediate coating product or any particular application process. In various embodiments, the coating layer may be formed by applying the intermediate product to the surface of the component by various processes including, but not limited to, certain dipping, spraying, taping, brushing, and painting processes.

In various embodiments, the intermediate coating product may include a slurry. In some embodiments, the slurry may include the ceramic powder, a carrier fluid (e.g., water and/or an organic solvent), and, optionally, one or more additional components such as, but not limited to, certain surfactants, chelators, stabilizers, and pH adjusters. In various embodiments, the carrier fluid may include a polymer with solvents, surfactants, and one or more suitable chemicals. Some nonlimiting examples of a suitable carrier fluid include 2,2,4-trimethyl-1,3-pentanediol monoisobutyrate, poly(iso-butyl methacrylate), ethyl cellulose, dimethyl silicone oil, dibutyl phthalate, or polyethylene glycol. In various embodiments, the slurry may have a solids loading of about 30 to 40 wt. %. In various embodiments, the slurry may be applied to the surface of the component via a spraying process, and have a solids loading of less than 30 wt. %. In some embodiments, the slurry may be thinned or diluted prior to application thereof on the surface of the component.

In various embodiments, the intermediate coating product may include a paste. In some embodiments, the paste may include the ceramic powder, a carrier fluid (e.g., water and/or an organic solvent), and, optionally, one or more additional components such as, but not limited to, certain thickeners, dispersants, or thinning agents (e.g., ester alcohol (Texanol™) or alpha-terpineol). In various embodiments, the paste may have a solids loading of about 65 to 85 wt. %. In various embodiments, the paste may be applied to the surface of the component via a spraying process or a painting process (e.g., brushing, troweling, etc.). In some embodiments, the paste may be thinned or diluted prior to application thereof on the surface of the component.

In various embodiments, the intermediate coating product may include a non-adhesive precursor tape. In some embodiments, the precursor tape may include a precursor layer and, optionally, a substrate layer. The precursor layer may include the ceramic powder, a matrix material, and, optionally, one or more additional components. The substrate layer may provide flexible support structure configured to temporarily support the precursor layer. In various embodiments, the tape may have a solids loading of about 30 to 60 wt. %. In various embodiments, the precursor tape may be cut to shape and applied to the surface of the component manually or by an automated process. In various embodiments, the tape may have a composition similar to the slurry described above.

In some embodiments, the applied intermediate coating product may undergo a drying process in, for example, an oven, box furnace, vacuum furnace, belt furnace, and any of numerous suitable heating techniques. The drying process, when implemented, may occur at a first predetermined temperature for a first predetermined time period, to remove solvents and produce a dried green coating (i.e., green state) on the surface of the component.

It will be appreciated that the first predetermined temperature and the first predetermined time may vary depending, for example, on the composition and type of the intermediate coating product. In some embodiments, the intermediate coating product may include an alcohol solvent, the first predetermined temperature may be a temperature that is 150° C. or less, and the first predetermined time period may be between 5 and 30 minutes. In some embodiments, the intermediate coating product may include water soluble solvents, the first predetermined temperature may be a temperature that is 100° C. or less, and the first predetermined time period may be between 10 and 60 minutes.

In some embodiments, the dried green coating may then undergo a binder burnout process (if necessary) in, for example, an oven, box furnace, vacuum furnace, belt furnace, or any of numerous suitable heating techniques. The binder burnout process, when implemented, may occur at a second predetermined temperature for a second predetermined time period to remove organics to produce a burned out, or brown coating on the surface of the component. In some embodiments, the drying process may be omitted and the binder burnout process may be performed on the applied intermediate coating product.

It will be appreciated that the second predetermined temperature and the second predetermined time may vary. In various embodiments, the second predetermined temperature may be a temperature of about 300° C. or less and the second predetermined time period may be between 5 and 30 minutes.

At 518, the method 500 may include performing a heat treatment in, for example, an oven, box furnace, vacuum furnace, belt furnace, and any of numerous suitable heating techniques, at a third predetermined temperature for a third predetermined time period to thermally process and melt the intermediate coating product, the brown coating, or the green coating, whichever is present. In various embodiments, the intermediate coating product, the brown coating, or the green coating, whichever is present, is entirely melted (inorganics) and/or burned out (organics) during the heat treatment. As such, in some embodiments, the drying process forms the green coating from the intermediate coating product, the binder burnout process forms the brown coating from the green coating, and the heat treatment is performed to melt the brown coating. In some embodiments, the drying process is omitted, the binder burnout process forms the brown coating from the intermediate coating product, and the heat treatment is performed to melt the brown coating. In some embodiments, the drying process and the binder burnout process are omitted, and the heat treatment is performed to melt and burnout the intermediate coating product.

The third predetermined temperature and third predetermined time period that are used to produce the intermediately processed coil may also vary depending, for example, on the composition of the ceramic powder and/or the intermediate coating product. In various embodiments, the third predetermined temperature may be based on the properties of the underlying surface of the component. In various embodiments, the underlying surface of the component includes non-magnetic or soft magnetic materials. In various embodiments, the third predetermined temperature may be a temperature sufficiently low such that magnetic properties of the component are not negatively affected.

In various embodiments, the surface of the component includes permanent magnetic properties, and the third predetermined temperature may be a temperature below a Curie temperature of the surface of the component. In various embodiments, the third predetermined temperature may be a temperature of 800° C. or less, such as 400 to 800° C., such as 750° C. or less, such as 700° C. or less, such as 650° C. or less, such as 600° C. or less, such as 550° C. or less, such as 500° C. or less, or such as 450° C. or less. In various embodiments, the third predetermined time may be between 10 and 30 minutes, such as between 15 and 30 minutes.

The resulting melt may then be cooled and solidified to form the coating layer on the surface of the component. In various embodiments, the coating layer is capable of surviving for a long term use in operating environments having temperatures in excess of 150° C., such as 180° C. or more, such as 200° C. or more, such as 220° C. or more, such as 240° C. or more, such as 260° C. or more, such as 280° C. or more, such as 300° C. or more, such as 320° C. or more, and/or such as 350° C. or more. The method 500 may end at 520.

In various embodiments, the method 500 may include applying the intermediate coating product, prior to thermally processing thereof, to all surfaces of all components of the electromechanical device that are likely to experience or are susceptible to operating environments having temperatures in excess of 150° C. for a long term during operation of the electromechanical device.

The electromechanical devices, components thereof, and methods of coating the components thereof disclosed herein provide various benefits over certain existing devices, components, and methods. For example, electromechanical devices typically include insulators that includes organic materials (e.g., polyamides) which are limited to long term operating temperatures of 150° C. or less. Operating at higher temperatures may result in the electrical insulation properties of the organic insulators decreasing significantly and thereby increasing a likelihood of arc-flashing, poor breakdown voltage, reduced lifetime, etc. Electromechanical devices having components with the coating layers described herein are capable of operating at elevated temperatures, such as above 180° C. over a long term. As such, the electromechanical devices are capable of improved voltage breakdown and thermal conductivity. In addition, the coating layers described herein may provide additional benefits such as, but not limited to, oxidation protection, chemical/environmental protection, and improved aesthetics.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

As used herein, the term "substantially" denotes within 5% to account for manufacturing tolerances. Also, as used herein, the term "about" denotes within 5% to account for manufacturing tolerances.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method comprising:

forming an intermediate coating product from a ceramic powder for application of the ceramic powder, wherein the ceramic powder includes:

between 40 and 54 weight percent $B_2O_3$;

between 3 and 5 weight percent $Al_2O_3$;

between 12 and 17 weight percent $SiO_2$; and between 28 and 38 weight percent BaO;

applying the intermediate coating product to a surface of a component of an electromechanical device; and thermally processing the intermediate coating product at a temperature of 800° C. or less to melt the intermediate coating product and thereby form an electrically insulative coating layer on the surface of the component, wherein the coating layer is configured to function in operating environments having temperatures in excess of 180° C. for at least for 40,000 operating hours of the component.

2. The method of claim 1, further comprising:

applying the intermediate coating product, prior to thermally processing thereof, to all surfaces of the component that are susceptible to operating environments having temperatures in excess of 150° C. during operation of the electromechanical device.

3. The method of claim 1, wherein the surface of the component includes magnetic properties, wherein thermally processing the intermediate coating product is performed at a temperature below a Curie temperature of the surface of the component.

4. The method of claim 1, wherein processing the ceramic powder is performed to form the intermediate coating product as a non-adhesive tape, a paste, or a slurry.

5. The method of claim 1, wherein processing the ceramic powder is performed to form the intermediate coating product as a slurry with a solids loading of between 30 and 40 weight percent, or performed to form the intermediate coating product as a paste with a solids loading of between 65 and 85 weight percent.

6. The method of claim 1, further comprising:

greater than 5 weight percent $Li_2O$; and a remainder including one or more additional components each having a weight percent of less than one.

7. The method of claim 1, wherein the surface of the component includes ASTM A801 Alloy Type 1, electrical steel, samarium cobalt, neodymium, or Mu-metal.

8. A method comprising:

forming an intermediate coating product from a ceramic powder for application of the ceramic powder, wherein the ceramic powder includes:

between 47 and 64 weight percent $B_2O_3$;

between 5 and 7 weight percent $SiO_2$;

between 9 and 14 weight percent ZnO;

between 6 and 9 weight percent BaO; and between 16 and 22 weight percent $Bi_2O_3$;

applying the intermediate coating product to a surface of a component of an electromechanical device; and thermally processing the intermediate coating product at a temperature of 800° C. or less to melt the intermediate coating product and thereby form an electrically insulative coating layer on the surface of the component, wherein the coating layer is configured to function in operating environments having temperatures in excess of 180° C. for at least for 40,000 operating hours of the component.

9. The method of claim 8, wherein a remainder of the coating layer includes one or more additional components each having a weight percent of less than 0.5.

10. The method of claim 8, further comprising:

applying the intermediate coating product, prior to thermally processing thereof, to all surfaces of the component that are susceptible to operating environments having temperatures in excess of 150° C. during operation of the electromechanical device.

11. The method of claim 8, wherein the surface of the component includes magnetic properties, wherein thermally processing the intermediate coating product is performed at a temperature below a Curie temperature of the surface of the component.

12. The method of claim 8, wherein processing the ceramic powder is performed to form the intermediate coating product as a non-adhesive tape, a paste, or a slurry.

13. The method of claim 8, wherein processing the ceramic powder is performed to form the intermediate coating product as a slurry with a solids loading of between 30 and 40 weight percent, or performed to form the intermediate coating product as a paste with a solids loading of between 65 and 85 weight percent.

14. The method of claim 8, wherein the surface of the component includes ASTM A801 Alloy Type 1, electrical steel, samarium cobalt, neodymium, or Mu-metal.

15. The method of claim 8, wherein the electromechanical device is a linear variable differential transformer, electric motor, generator, transformer, inductor, relay, solenoid, actuator, or sensor, wherein the component is at least a portion of a stator, a rotor, a stator and rotor stack interlaminate insulation, a core, a frame, a motor end bell, a magnetic return wall, a surface of enclosures or housing, a feedthrough, or a conductor joint.

16. An electromechanical device, comprising:

components each having one or more surfaces formed of one or more metallic materials and susceptible to operating environments having temperatures in excess of 150° C. for a long term; and electrically insulative coating layers formed on the one or more surfaces of the components, wherein the coating layers are configured to function in operating environments having temperatures in excess of 180° C. for at least for 40,000 operating hours of the components;

wherein the coating layers include:

between 27 and 33 weight percent $B_2O_3$;
between 24 and 30 weight percent BaO;
between 12 and 16 weight percent MgO;
between 11 and 13 weight percent $SiO_2$;
between 5 and 7 weight percent $Al_2O_3$;
between 3 and 4 weight percent $ZrO_2$; and
between 2.5 to 3.5 weight percent $TiO_2$.

17. The electromechanical device of claim 16, wherein a remainder of the coating layers include one or more additional constituents each having a weight percent of less than one.

18. The electromechanical device of claim 16, wherein the one or more surfaces of the components includes magnetic properties, wherein the coating layers were formed by a process that included thermally processing an intermediate coating product on the components to melt the intermediate coating product and thereby produce the coating layers, wherein the thermal processing was performed at a temperature below a Curie temperature of the one or more surfaces of the components.

19. The electromechanical device of claim 16, wherein the components include a first conductive surface of a first conductor electrically coupled to a second conductive surface of a second conductor via an electrically conductive joint, and at least one of the coating layers cover the first conductive surface of the first conductor, the second conductive surface of the second conductor, and the electrically conductive joint.

20. The electromechanical device of claim 16, wherein the one or more surfaces of the components include ASTM A801 Alloy Type 1, electrical steel, samarium cobalt, neodymium, or Mu-metal.

* * * * *